United States Patent
Li et al.

(10) Patent No.: US 9,973,980 B2
(45) Date of Patent: May 15, 2018

(54) COMMUNICATIONS METHODS AND APPARATUS THAT FACILITATE HANDOVER DECISIONS AND RELATED MEASUREMENTS

(71) Applicant: QUALCOMM Incorporated, San Diego, CA (US)

(72) Inventors: Junyi Li, Chester, NJ (US); Nilesh Nilkanth Khude, Somerset, NJ (US); Saurabha Rangrao Tavildar, Jersey City, NJ (US); Vincent Douglas Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 477 days.

(21) Appl. No.: 13/787,544

(22) Filed: Mar. 6, 2013

(65) Prior Publication Data

US 2014/0256328 A1    Sep. 11, 2014

(51) Int. Cl.
*H04W 36/00* (2009.01)
*H04L 5/00* (2006.01)
(Continued)

(52) U.S. Cl.
CPC ...... *H04W 36/0055* (2013.01); *H04B 17/318* (2015.01); *H04L 5/0051* (2013.01);
(Continued)

(58) Field of Classification Search
CPC .............................................. H04W 36/0055
(Continued)

(56) References Cited

U.S. PATENT DOCUMENTS

| | | | |
|---|---|---|---|
| 6,434,129 B1 * | 8/2002 | Struhsaker | ............ H04L 1/0071 370/329 |
| 2009/0046665 A1 | 2/2009 | Robson et al. | |

(Continued)

FOREIGN PATENT DOCUMENTS

| | | |
|---|---|---|
| CN | 101427598 A | 5/2009 |
| CN | 102823299 A | 12/2012 |

(Continued)

OTHER PUBLICATIONS

"LTE; Evolved Universal Terrestrial Radio Access (E-UTRA); Physical Layer Procedures (3GPP TS 36.213 version 10.2.0 Release 10)," ETSI TS 136 213 v10.2.0 (Jun. 2011), Technical Specification, Jun. 2011, ETSI, Sophia-Antipolis Cedex, FR, 122 pgs.

(Continued)

*Primary Examiner* — Vladimir Magloire
*Assistant Examiner* — David Orange
(74) *Attorney, Agent, or Firm* — Holland & Hart LLP

(57) ABSTRACT

Methods and apparatus that facilitate handover related measurements and decision making in a communications system including user equipment (UE) devices, a macro base station and femto base stations (femtocells) are described. In some embodiments a UE device transmits pilots along with identification information using UE device selected transmission resources from a set of recurring UE pilot transmission resources dedicated by a macro base station for UE pilot signal and related device information transmission purposes. Femto base stations measure the UE transmitted pilot signals and report the signal strength measurement results and corresponding device identifiers to a handoff decision control entity, e.g., an eNodeB or control node, which makes handover decisions. By relying on UE transmitted pilots measured by multiple base stations, e.g., femto base stations, the need for femto cells to transmit pilots can be reduced (Continued)

while well informed UE handoff decisions still being possible.

20 Claims, 6 Drawing Sheets

(51) Int. Cl.
| | | |
|---|---|---|
| *H04W 16/00* | (2009.01) | |
| *H04B 17/318* | (2015.01) | |
| *H04W 36/30* | (2009.01) | |
| *H04W 84/04* | (2009.01) | |
| *H04B 17/309* | (2015.01) | |

(52) U.S. Cl.
CPC .......... *H04L 5/0057* (2013.01); *H04W 16/00* (2013.01); *H04B 17/309* (2015.01); *H04W 36/30* (2013.01); *H04W 84/045* (2013.01)

(58) Field of Classification Search
USPC ................................................ 455/436–444
See application file for complete search history.

(56) References Cited

U.S. PATENT DOCUMENTS

| | | |
|---|---|---|
| 2009/0291686 A1 | 11/2009 | Alpert et al. |
| 2010/0027510 A1 | 2/2010 | Balasubramanian et al. |
| 2010/0124927 A1 | 5/2010 | Eskicioglu et al. |
| 2010/0165882 A1 | 7/2010 | Palanki et al. |
| 2010/0260121 A1 | 10/2010 | Gholmieh et al. |
| 2011/0028144 A1 | 2/2011 | Catovic et al. |
| 2011/0053604 A1* | 3/2011 | Kim ...................... H04W 16/16 455/450 |
| 2011/0134747 A1 | 6/2011 | Kwon et al. |
| 2011/0274097 A1 | 11/2011 | Zhang et al. |
| 2012/0076106 A1 | 3/2012 | Bhattad et al. |
| 2012/0113862 A1 | 5/2012 | Santhanam et al. |
| 2012/0213092 A1 | 8/2012 | Sun et al. |
| 2012/0225662 A1 | 9/2012 | Jo et al. |
| 2014/0073368 A1 | 3/2014 | Teyeb et al. |
| 2014/0274079 A1 | 9/2014 | Li et al. |
| 2014/0364116 A1* | 12/2014 | Jorguseski et al. ........... 455/434 |

FOREIGN PATENT DOCUMENTS

| | | |
|---|---|---|
| WO | WO-2010017212 A1 | 2/2010 |
| WO | WO-2013037842 A1 | 3/2013 |

OTHER PUBLICATIONS

Mediatek Inc., "Methods for Efficient Discovery of Small Cells," 3GPP TSG-RAN WG1 #72, R1-130225, Agenda Item 7.3.5.3, Jan. 28-Feb. 1, 2013, St. Julian's, Malta, 4 pgs.

ISA/EPO, International Search Report and Written Opinion of the International Searching Authority, Int'l App. No. PCT/US2014/019277, Jul. 1, 2014, European Patent Office, Rijswijk, NL, 13 pgs.

Qualcomm Incorporated, "Mechanisms for Efficient Small Cell Operation," 3GPP TSG-RAN WG1 #72, R1-130595, Agenda Item 7.3.5.3, Jan. 28-Feb. 1, 2013, St. Julian, Malta, 3 pgs.

* cited by examiner

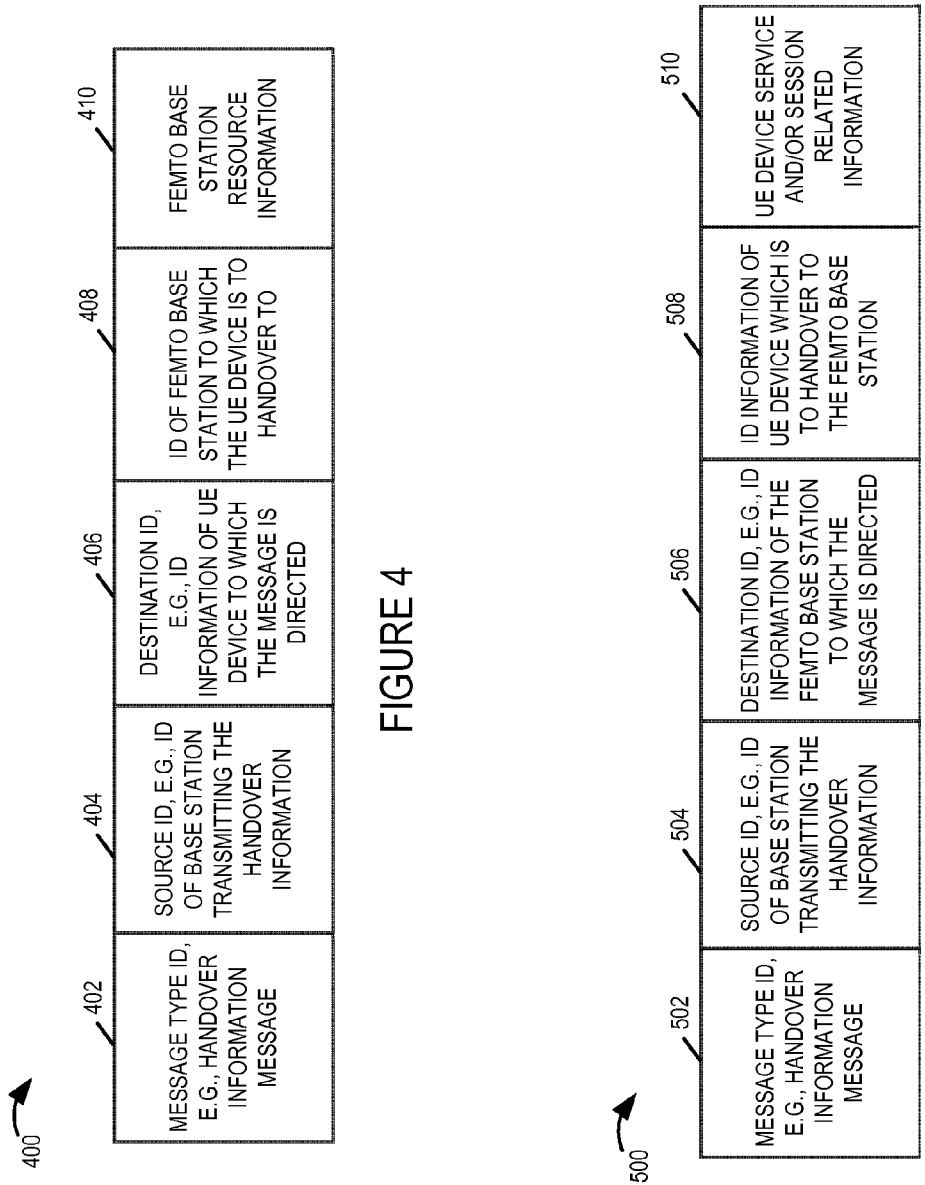

COMMUNICATIONS METHODS AND APPARATUS THAT FACILITATE HANDOVER DECISIONS AND RELATED MEASUREMENTS

FIELD

Various embodiments relate to wireless communications methods and apparatus and, more particularly, to wireless communications methods and apparatus for handover related measurements and signaling in systems where femto base stations are deployed in addition to mobile terminals and macro base stations.

BACKGROUND

In the cellular systems, the handover related measurements are traditionally done by a User Equipment device commonly referred to as a UE. Normally the base-stations transmit wideband pilots for channel estimations as well as for RSSI (Received Signal Strength Indication) measurements. UEs perform measurements on the received pilot signals and report the RSSI measurements of a candidate base station to the serving base station. The working assumptions of such designs are that the base stations are deployed in a planned fashion, the base stations are always transmitting and that the number of UEs is much larger than the number of base stations.

However with the advent of small cells, also commonly referred to as femtocells or femto base stations, such assumptions are not always valid. Small cells are very useful for the capacity offload and it is envisioned that future cellular systems will have a dense and unplanned deployment of the small cells co-existing with macro cells with relatively large coverage areas co-existing and sharing the cellular frequency band with the femto cells.

Consider such a scenario of dense deployment of small cells where the small cells in an area are comparable in number or out number the number of active UEs in that area. In such a scenario the number of UEs per small cell is very small and many of the small cells may not have any UE to serve most of the time. However the small cells will still need to transmit pilots to facilitate handover measurements if the same approach is used for the femto cells as is currently used for macro cells. This can cause one or more the following problems. If the small cells transmit pilots like macro base stations, it can cause pilot pollution, that is, the pilots transmitted by the numerous femto cells can cause unnecessary interference to the downlink (DL) traffic of an active UEs and can also affect the accuracy of handover measurements as they become inaccurate due to interference between pilots transmitted by different femto cell base stations.

While orthogonalizing pilots to reduce interference of small cells is one approach to addressing interference issues, when there are a larger number of such small cells this approach either requires more resources for pilots than in the case of macro cell deployments which have fewer cells or it increases delays to get multiple measurements since the time between consecutive pilot transmissions of a femto base station would have to be extended, given the limited sets of resources, to reduce potential conflicts and/or interference between pilots transmitted by different femto cells.

It should be appreciated that in future cellular deployments handoffs between macro cells and femto cells will likely have to be supported as well as handoffs between femto cells. In such systems, the need for reliable information to be used in making a handoff decision in a timely manner between cells will be important.

In view of the above discussion it should be appreciated that there is a need for improved methods and/or apparatus which can facilitate handover decisions in a system including one or more femto cells. It would be desirable if the methods and/or apparatus were well suited for systems with potentially large numbers of femto cells. It would also be desirable if the methods, in at least some embodiments, were compatible with the co-existence macro cells and femto cells with one or more femto cells potentially being in the coverage area of a macro cell. It would be desirable if at least some of the methods and/or embodiments allowed for handover decision making to occur without the need for femtocells to transmit pilots and/or without the need for pilot transmission coordination between femtocells and a macro base station.

SUMMARY

Methods and apparatus that facilitate handover related measurements and decision making in a communications system including user equipment (UE) devices and femto base stations are described. In some embodiments the system also includes one or more macro base stations (e.g., eNodeBs). A femto cell may be located in the coverage area of a macro base station and use the same cellular band as the macro base station.

At a given time a UE, e.g., a user equipment device such as a wireless terminal, mobile cell phone, etc., maybe served by a femto base station or a macro base station. Thus, it is possible for either a femto base station or macro base station to operate as a serving base station at a given point in time. Handoffs between femto base stations and between macro and femto base stations are supported.

Some of the features described in various embodiments are well suited for systems with dense deployment of femto base stations, for example, in an area where the number of femto base stations is comparable to or exceeds the number of active UEs in that area. However, such a ratio of devices is not necessary to use various features described herein. One or more features described herein facilitate handover decision making without requiring femto base stations to transmit pilots and/or without the need for pilot transmission coordination between femto base stations and a macro base station.

In accordance with one aspect of some embodiments a macro base station allocates periodic resources in uplink (UL) resources for active UEs, e.g., such as RRC_CONNECTED UEs in LTE system embodiments, to transmit wideband signals, e.g., pilot signals. In some embodiments not all the UEs that transmit in the allocated resources are in communication with the macro base station. The UE pilot signal transmission resources are dedicated for use by UEs in transmitting pilot signals along with related information, e.g., device identification information so that it is possible to identify a device which transmitted a pilot using one of the UE pilot signal transmission resources. While the UE pilot signal transmission resources are dedicated to the purpose of communicating UE pilot signals and related information, UEs use the dedicated resources on a contention and/or co-existence basis with the UE pilot signal resources being available for use by multiple UEs which contend for the resources.

The dedicated UE transmission pilot resources are in addition to normally resources UEs may use to communicate user data and/or other signals to a macro base station, e.g., when the macro base station is operating as the UE device's serving base station and/or when a UE is seeking to gain access to the macro base station.

The small cells, e.g., femto cells, under the coverage area of the macro base station do not schedule any UE transmissions on the periodic resources dedicated by the macro for UE pilot signals and the macro base station also leaves these resources unused so that they are available to the UE devices without interference from macro or femto cell transmissions or from UE transmissions scheduled by the macro base station or femto base stations.

In accordance with some embodiments an active UE autonomously chooses one of the dedicated UE pilot signal transmission resources and transmits periodically on the resource a pilot signal along with device identification information allowing a receiving device to identify the UE which transmitted the pilot signal. The pilot signal maybe, and in some embodiments is, a wideband pilot signal, e.g., a signal corresponding to more than one tone or frequency. In some embodiments the identification information is e.g., a S-TMSI (System architecture evolution-temporary mobile subscriber identity).

In some embodiments the identification information can be implicitly transmitted with the pilot signal, e.g., the pilot signal can depend on the identification information of the UE.

One exemplary method of operating a user equipment (UE) device in a system including a serving base station and at least one femto base station, includes: transmitting a pilot signal and UE device identification information on transmission resources dedicated by a macro base station for transmission, by UE devices, of pilots and related UE device information and receiving handover information from said serving base station indicating that said UE device should handoff from said serving base station to a femto base station. The serving base station may be either a macro cellular base station or a femto base station depending on which base station is acting as the UE's serving base station at the time the handoff decision is made based on the pilots received from the UE and/or other information.

An exemplary user equipment device comprises at least one processor configured to: transmit a pilot signal and UE device identification information on transmission resources dedicated by a macro base station for transmission of pilots and related UE device information; and receive handover information from said serving base station indicating that said UE device should handoff from said serving base station to a femto base station. The user equipment device may, and in some embodiments does, include a memory coupled to the at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 4 illustrates an exemplary handover information message, e.g., communicated from a base station, e.g., eNodeB, to a user equipment device, in accordance with an exemplary embodiment.

FIG. 5 illustrates another exemplary handover information message, e.g., communicated from a base station, e.g., eNodeB, to a femto base station, in accordance with an exemplary embodiment.

DETAILED DESCRIPTION

Figure 1:
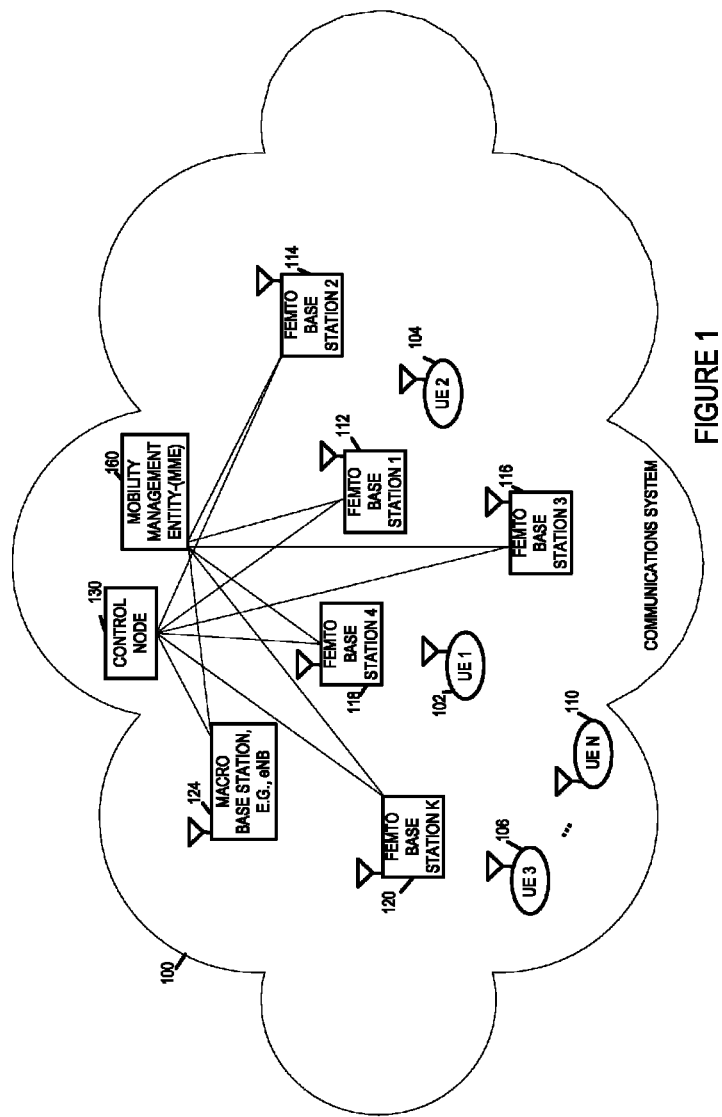
FIG. 1 illustrates an exemplary wireless communications system implemented in accordance with one exemplary embodiment.

FIG. 1 illustrates an exemplary communications system 100 that includes a base station 124, a plurality of wireless terminals, e.g., user equipment devices (UEs), including UE 1 102 through UE N 110, and a plurality of small cells (femto cells) also referred to as femto base stations including femto base station 1 112 through femto base station K 120. The base station 124 is a macro base station and in some embodiments serves as an attachment point, e.g., serving base station, for at least some of the UEs in the system 100. The macro base station 124 may, and in some embodiments is, implemented as an eNodeB. The femto base stations 112, 114, 116, 120 are all within the coverage area of the macro base station 124 and share a cellular frequency band with the macro base station 124 which is used for communicating with the UEs 102, 106, 110. While a single macro base station is shown, it should be appreciated that the communications system may include multiple macro cells, e.g., with a macro base station and one or more femto cells within the coverage of the macro base station. Thus, it should be appreciated that the arrangement shown in FIG. 1 is exemplary and other arrangements/numbers of base stations are possible. In addition to the base stations and the UEs, system 100 further includes a mobility management entity (MME) 160 and a control node 130, e.g., a central control entity. The control entity 130 maybe, and in some embodiments is, a radio network controller. The macro and femto base stations exchange signaling and information with the MME device 160 to provide communications services to the wireless terminals in the system 100. While a single MME 160 is shown in FIG. 1, it should be appreciated that the system 100 may include multiple MMEs.

The UEs shown in FIG. 1 support Wide Area Network (WAN) communications, e.g., cellular network communications through base stations, e.g., femto and/or macro base stations, as well as peer to peer communications, e.g., direct device to device communications. In some, but not necessarily all, embodiments, one or more of UE devices are implemented as portable communications devices such as handheld cell phones or portable personal data assistant (PDA) devices. Various base stations (e.g., macro and femto base stations) and/or the other infrastructure elements such as the control node 130 and MME 160, in some embodiments, are coupled via a backhaul link, to one another and/or to other infrastructure nodes for exchanging information. The backhaul link may be, and in some embodiment is a wired communications link while in other embodiments all or a portion of the backhaul is implemented using one or more wireless links.

As should be appreciated, FIG. 1 illustrates an example where there is a dense deployment of femto base stations, e.g., where the number of femto base stations is comparable or exceeds the number of active UEs in the area, e.g., K≥N, in the particular exemplary embodiment. In accordance with one aspect of some embodiments, the macro base station 124 allocates periodic dedicated transmission resources for UE transmission of pilots and corresponding device identification information. The Macro base station dedicated UE pilot transmission resources are dedicated to communicating UE pilots and related information, e.g., device identification information allowing the source of a transmitted pilot to be identified but are not assigned by the macro base station 124 to specific UE devices. Active UE devices use the dedicated UE pilot signal resources on a contention basis, i.e., individual UE devices attempt to use the resources without the assistance or assignment by a centralized controller of specific pilot transmission resources to individual UE devices.

The dedicated UE pilot transmission resources are not used by the macro base station 124 or femto base stations 112 to 120 for the communication of user data or other signals to UE devices and are left available, i.e., unused by the base stations, so that they are available to UE devices for pilot signal transmissions. The dedicated UE pilot transmission resources are in addition to any communications resources assigned to or used by a UE as part of communicating user data to or receiving user data from, the macro or femto base stations. Thus, UE devices may transmit and/or receive pilots as part of communicating user data, e.g., audio, video or application data, in addition to transmitting the pilots in the dedicated UE pilot transmission resources. While dedicated UE pilot transmission signaling communications resources recur in a predictable, e.g., periodic basis, as part of a recurring macro base station timing interval, the individual resources may hop in frequency in a predictable, e.g., predetermined manner, over time with the hopping pattern being known to the UE devices and base stations 124, 112, 114, 116, 120. In some embodiments, the serving base station of the active UE may trigger the active UE to start transmitting pilot signals periodically in a subset of the dedicated UE pilot transmission resources.

In at least one embodiment UE devices selects a subset of transmission resources to use from the resources dedicated for transmitting UE pilots and related signals. The selection of transmission resources may be based on signal energy and/or the detection of signals with the UE, e.g., UE 102, attempting to select pilot signal transmission resources which are unused by another UE device. The UE 102 transmits pilots along with identification information using the selected transmission resources. The pilots may be wideband signals, e.g., a pilot signal may include a sequence transmitted on multiple tones, e.g., each tone corresponding to a different frequency and may last for one or more symbol transmission time periods. In an OFDM embodiment, a pilot signal may include energy transmitted on multiple tone-symbols, e.g. each tone-symbol corresponding to one tone for one symbol transmission time period. The device identification information may be transmitted with the pilots, e.g., tones transmitted with a predetermined amount of energy and phase, using tone-symbols other then those used to transmit the pilot tone-symbols and/or transmitted during a subsequent OFDM symbol transmission time period.

The femto base stations monitor for, receive the UE transmitted pilot signals, perform measurements, e.g., received signal strength and/or other signal measurements thereon such as SNR measurements, and report the measurement results and corresponding device identifiers to a handoff decision control entity, e.g., the base station 124 or the control node 130, which makes handover decisions. The macro base station may operate in a similar manner monitor for, receive and measure the UE transmitted pilots and optionally reporting the results along with device identification information to the control node 130 when the macro base station 124 is not the handover control decision making entity. Thus, the handover decision making control entity whether that be macro base station 124 or control node 130 receives UE pilot signal strength measurements obtained by measuring pilot signals received on the dedicated UE pilot signal transmission resources. The handover decision entity makes a handover decision based on the received information which, in addition to the UE pilot signal measurements, may include signal strength information received from the UE's currently serving base station that is generated independently from the UE pilot signals transmitted on the dedicated UE transmission pilot communications resources. The handoff decision, when made, is communicated to a UE device, e.g., UE 1 102, via the serving base station and the macro base station or femto base station to which the UE device is to be handed off to is also notified of the handoff decision.

Transmissions using the resources dedicated by the macro base station 124 for UE pilot signal transmission which occur on a contention basis, are implemented by UE devices based on their understanding of the macro base station's timing. In cases where the macro base station 124 is operating as the UE's serving base station the UE may, and in some cases will be, subject to closed loop timing control by the macro base station, e.g., with the macro base station 124 sending unicast timing control adjustment signals to the UE instructing it how to adjust its timing to synchronize with the timing being used by the base station. In cases where a UE that is not being served by the macro base station 124 at the time seeks to use the dedicated UE pilot transmission resources, the UE will control the timing used to determine when to transmit the UE pilot signal and identification information based on open loop timing control implemented with respect to the macro base station 124, e.g., based on broadcast pilot or other timing reference signals received from the macro base station 124 but without the benefit of closed loop timing control signals. It should be appreciated that in the case where the UE is being served by a femto cell and is timing controlled by the femto cell for data transmission purposes, the UE 102 may use femto cell timing to control transmission of data and/or pilots intended for the serving femto cell while using open loop timing control based on macro cell broadcast signals for controlling the timing of UE pilot signals on the dedicated UE pilot signal transmission resources. Thus, UE's within the coverage area of the macro cell will base UE pilot signal transmission timing based on macro cell timing regardless of whether they are being serviced by a femto cell or macro cell 124 at the time of UE pilot signal transmission on the dedicated resources.

Figure 2:
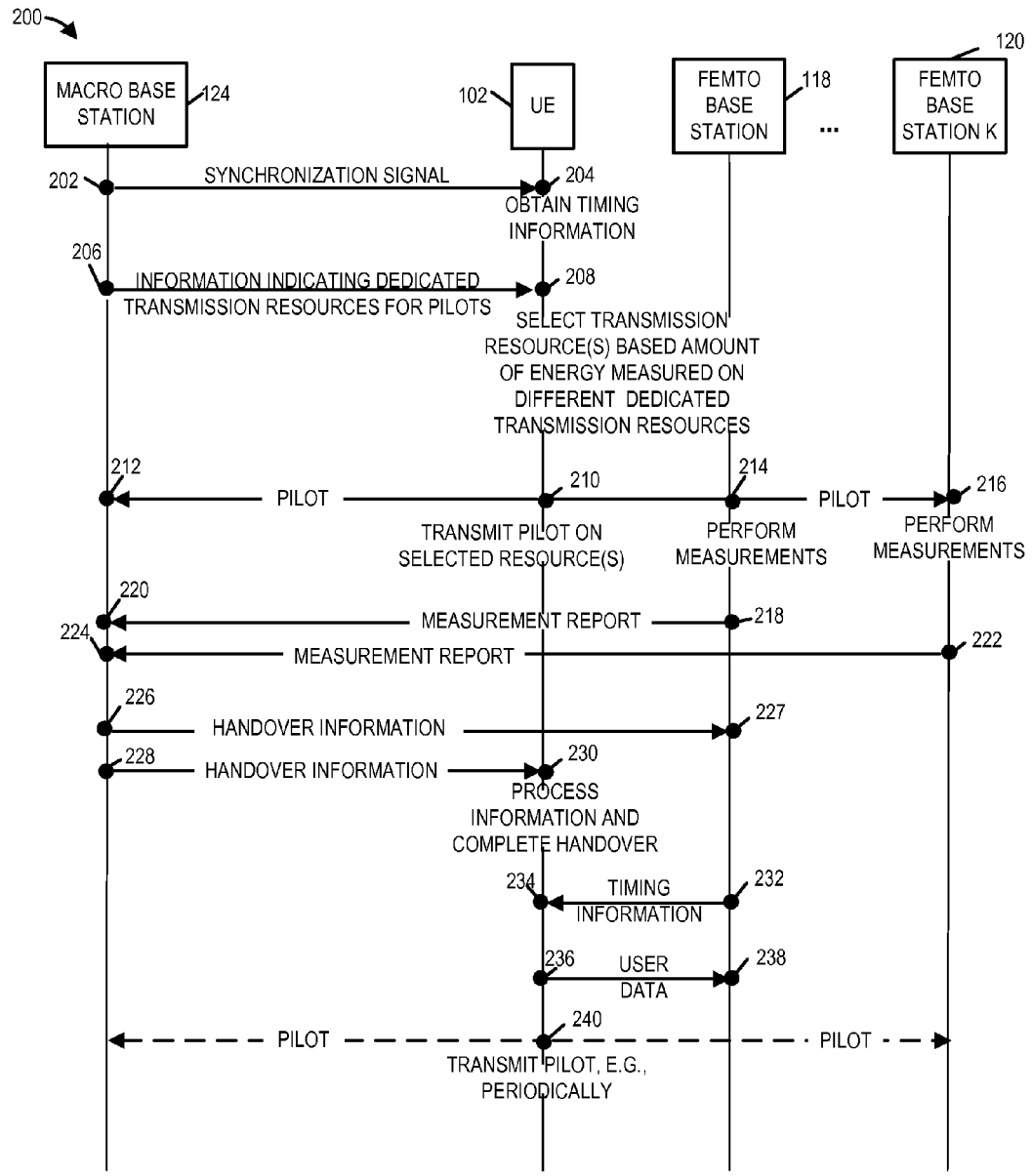
FIG. 2 illustrates the steps and associated signaling exchange between various devices of FIG. 1 in an exemplary embodiment where handover decision making is performed based on measurements performed by one or more femto base stations on pilots transmitted by a user equipment device, in accordance with an exemplary embodiment.

The steps and signaling in involved in an exemplary method can be understood with reference to FIG. 2. FIG. 2 is a drawing 200 illustrating the steps and associated signaling used in one exemplary embodiment where handover operation is performed based on measurements performed by one or more femto base stations on pilots transmitted by a UE, e.g., use 102 on transmission resources dedicated by a macro base station, e.g. macro base station 124 for pilot transmissions by UE devices irrespective of whether the UE's are being serviced by the macro base station. In accordance with one feature, as discussed above, the one or more femto base stations 118, 120 will perform measurements on pilots transmitted by the UE 102 and/or other UEs and report the measurements back to the macro base station 124, e.g., eNodeB, serving the UE 102 (or control node 130). Based on the measurement reports, the base station 124 (or a control node 130 in the network) decides if a handover should be performed, and if so, which femto base station should the UE handover to. For the purpose of discussion of the FIG. 2 example consider that the macro base station 124 is the serving base station for the UE 102 prior to handover and that the macro base station 124 operates as the handover decision making entity.

Various devices participating in the exemplary method illustrated in FIG. 2 are shown on the top, and include UE 102, the macro base station 124, and one or more femto base stations including femto base station 118, . . . , femto base station K 120. It should be appreciated that these devices are elements of the system of FIG. 1 and that FIG. 2 shows a method which may be used in the FIG. 1 system. Various signals, e.g., pilots and/or messages, that may be exchanged between devices are shown using arrows.

In FIG. 2 example the process is initiated in step 202 where the base station 124 transmits a synchronization signal which is received by the UE device 102 in step 204. In step 204 the UE 102 obtains timing information, e.g., timing information used to determine when to transmit pilot signals on the UE pilot signal communications resources. Thus, in some embodiments macro base station transmitted pilot signals are used as open loop timing control information used to determine when to transmit one or more pilots on the dedicated UE pilot signal transmission resources.

In step 206 the macro base station 124 transmits information indicating periodic transmission resources dedicated for transmission of pilots and related device identification information. This information may be broadcast to the UE devices using broadcast channel (BCH). The receipt of the information indicating the dedicated UE pilot transmission signal resources is illustrated in step 208 where the UE 102 receives the information. Since the signal communicating the dedicated resources is broadcast, UEs in the range of the macro base station 124 will receive the same information and be aware of the resources from which they may select for pilot UE pilot transmission purposes.

In accordance with one aspect, the femto base stations under the coverage area of the macro base station 124 do not schedule UEs for data transmission or reception during the occurrence of these dedicated periodic transmission resources. In other embodiments however, some resources other than the dedicated periodic transmission resources may be used during the time intervals which include UE dedicated pilot transmission signaling resources but the dedicated pilot transmission resources are left unused by the macro and femto cells and UEs are precluded from using the dedicated pilot signal resources for communicating non-pilot signal related data, information or signals. The UE's are left to select from the available resources and use them for pilot signal transmissions without interference from macro cell transmissions, femto cell transmissions and without interference from user data transmissions from UE devices.

While the broadcast UE pilot signal resource information indicates the transmission resources dedicated by the macro base station for transmission of UE pilots and related device information, e.g., device identification and/or capability information such as modes of communication supported by the UE which can facilitate a handover decision, in various embodiments the macro base station 124 does not assign particular resources to specific UEs. The UE 102 monitors the dedicated transmission resources, e.g., to measure energy on the transmission resources, and selects one or more transmission resources based on an amount of energy detected on the resource. For example, the UE 102 may select a transmission resource with the least amount of detected energy, e.g., a resource which is deemed vacant or unused by other UEs. Thus the selection of one or more resources, from the transmission resources dedicated by the macro base station, is autonomously done by the UEs. The selected resource or resources are sufficient to transmit a UE pilot signal and corresponding device identification information. The device identification information transmitted with a pilot is important in that it allows the receiving and/or control device to identify the device transmitting the pilot thereby enabling association of pilot signal measurement information with the transmitting device to which a received pilot signal measurement corresponds.

Next in step 210, based on the determined timing, e.g., macro base station timing, the UE device 102 transmits a pilot signal and UE device identification information on the selected transmission resource(s). Additional information may, and in some embodiments is, transmitted with the UE pilot signal allowing a receiving device to determine what modes of communication are supported by UE device and thus what types of base stations, can serve the UE device transmitting the UE pilot signal. Additional information may also include buffer status of the UE, its traffic data rate requirements and QoS requirements which may assist a receiving femto base station determine if it can serve UE device. In some embodiments, the additional information may be available at the serving base station of the UE device or at the control node and may be used in making handover decisions.

In various embodiments the pilot is transmitted from the UE device 102 at a predetermined, e.g., fixed known, power level. In some embodiments the transmitted pilot is a wide-band pilot signal and the device identification information is e.g., S-TMSI (SAE temporary mobile subscriber identity). As illustrated in the figure the transmitted pilot and device identification information is received in by the femto base station 118 and femto base station 120 in steps 214 and 216 respectively.

In steps 214 and 216 respectively the femto base stations 118, 120 perform measurements on the received pilot signal. In some embodiments, the measurements include received signal strength indicator (RSSI) measurements, reference signal received power (RSRP) measurements, reference signal received quality (RSRQ) measurements, carrier RSSI measurements, signal to noise ratio (SNR) measurements, signal to noise-plus-interference ratio (SINR) measurements. Thus in some embodiments the femto base stations 118, 120 perform various measurements on the pilot transmission from the UE device 102. In step 218 the femto base station 118 sends a measurement report including signal strength information and UE device identification information to the base station 124, which is considered to be the handoff decision making entity in this example. In step 222 the femto base station K 120 sends its measurement report including signal strength information and UE device identification information to the base station 124. In some embodiments the measurement reports are sent by the femto base stations to the UE's donor eNodeB. In some such embodiments the femto base stations 118, 120 determine information regarding the donor eNodeB of a UE for which pilot signal measurements are to be reported by communicating identification information of the UE (e.g., S-TMSI), from which the pilot and identification information was received, to the mobility management entity 160 (MME). In some other embodiments the femto base stations 118, 120 send the measurement report to a central control entity, e.g., a radio network controller (RNC), that makes handover decisions in some embodiments. As a result of the UE pilot signal measurement and reporting process, the handoff decision making entity, e.g., macro base station 124 or control node 130, will receive multiple signal measurements corresponding to the same pilot signal transmission from UE device 102. In some embodiments to facilitate coordination of the pilot signal measurements, in addition to reporting signal strength the femto base stations report the time at which the pilot signal and corresponding device identifier were received. This allows for the handoff controller to correlate and compare received signal strength measurements of a UE pilot signal received by multiple femto cells and/or the macro base station 124 in a reliable manner.

In step 220, 224 the base station 124 receives the measurement reports from the femto base stations 118 and 120 respectively and process the received information for making a decision whether or not the UE 102 should handover from its current serving base station to another base station. The handoff decision may involve a decision to handoff between femto cells and/or between a femto cell and the macro base station 124.

For purposes of discussion consider that the base station 124 which is serving the UE at the start of the FIG. 2 example determines, based on the received measurement reports, that femto base station 118 is more suitable than the macro base station 124 for serving the UE 102, e.g., due to close proximity, better channel quality and/or less loading of the femto base station 118. In step 226 the base station 124 sends a handover message, e.g., via a backhaul link, to the femto base station 118 indicating the UE 102 is going to be handed over to the femto base station. In addition to the handover information, the handover message sent to the femto BS 118 may and in some embodiments does include other service related information corresponding to the UE 102. The handover information is received by femto base station 118 as shown in step 227.

In step 228 the base station 124 sends a handover message including handover information and indicating the decision that the UE 102 should handover to another base station, to the UE 102, e.g., over a wireless radio communications link. In some embodiments the handover message sent to the UE 102 also includes information indicating one or more parameters, such as, information regarding the frequency band in which the femto base station 118 operates. In some cases where the cell to which the handoff occurs uses a different technology than the macro which is supported by the UE, the handoff message also indicates the mode of operation to be used when communicating with the femto cell 118. The UE 102 receives and processes the handover message in step 230. After processing the information and determining that it has been instructed to handover to femto base station 118, the UE 102 completes the handover operation. It should be appreciated that there may be additional signaling exchange between the UE 102 and the femto base station prior to the completion of handover.

Following the completion of handover, the UE 102 obtains timing information from the femto base station 118 to which the UE 102 handover. In some embodiments the timing information, e.g., timing control information to advance or retard timing used by UE to communicate with femto, is obtained from a signal, e.g., a closed loop timing control signal, received from the femto base station 118 as shown in steps 232 and 234. In accordance with one feature of some embodiments, the UE 102 communicates user data, e.g., traffic data, to the femto base station 118 in accordance with the timing information obtained from the femto base station 118. Assuming that UE 102 has user data to be transmitted, in step 236 the UE 102 transmits the user data to the femto 118 which is received by the femto base station as illustrated in step 238.

In step 240 it is illustrated that the UE 102 transmits, e.g., periodically, a pilot and UE identification information. However it should be noted that the pilot and UE identification information is transmitted in accordance with the timing information obtained from the macro base station 124. In some embodiments, UE 102 may not transmit pilot and UE information periodically until notified by the serving femto base station 118 to transmit pilot and UE information. The serving base station notifies the UE to transmit pilot based on the estimated path loss between femto base station 118 and UE 102.

Figure 3:
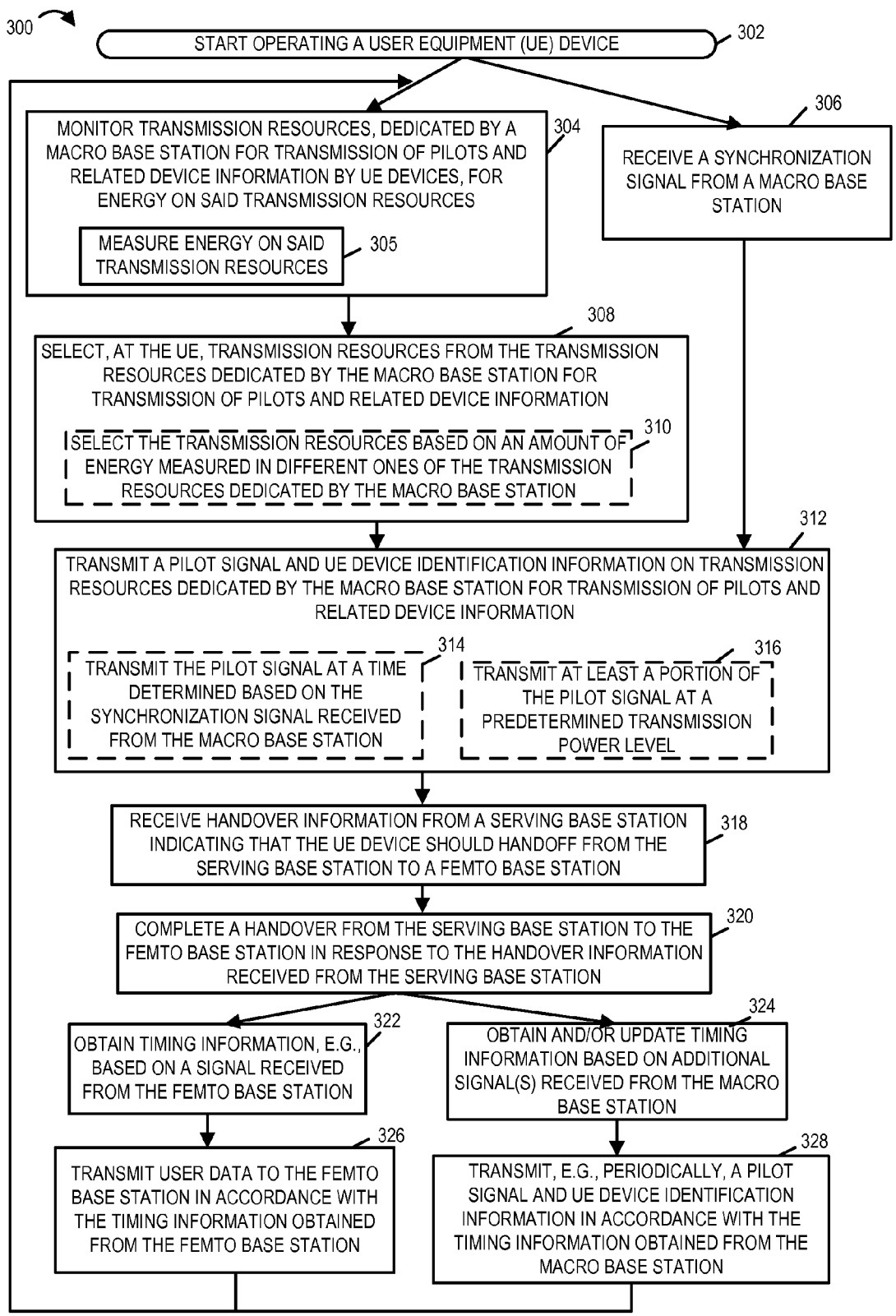
FIG. 3 is a flowchart illustrating an exemplary method of operating a user equipment device of the system shown in FIG. 1, in accordance with one exemplary embodiment.

While some examples discussed above have been used to describe various features, the method used in some embodiments will become even clearer when considered in view of the flow chart shown in FIG. 3.

FIG. 3 is a flowchart 300 showing the steps of an exemplary method of operating a communications device, e.g., a UE, in accordance with an exemplary embodiment. In some embodiments the UE device implementing the method of flowchart 300 is any one of the UEs shown in FIG. 1. For the purposes of discussion consider that UE 1 102 is device implementing the method of flowchart 300.

Operation starts in step 302. In step 302 the UE 1 102 is powered on and initialized. Operation proceeds from start step 302 to steps 304 and 306 which are performed asynchronously in some embodiments. In step 304 the UE 1 102 starts monitoring transmission resources, dedicated by a macro base station for transmission of pilots and related device information by UE devices, for energy on the transmission resources. In various embodiments the UE 1 102 performs monitoring to detect energy on the dedicated transmission resources. This is indicated in step 305 in which the UE 102 measures energy on the dedicated transmission resources. As discussed earlier, the purpose of measuring the energy is to find transmission resources with low, e.g., below a threshold level, or minimum energy. In accordance with one aspect, the transmission resources which have least detected energy are deemed vacant/unoccupied and are considered most suitable by the UE for pilot transmissions. In some embodiments the related device information is e.g., a device identifier.

Operation proceeds from step 304 to step 308. In step 308 the UE 102 selects transmission resource(s) from the transmission resources dedicated by the macro base station for transmission of pilots and related device information. In various embodiments step 310 is performed as part of the selection step 308 where the UE selects the transmission resource(s) based on an amount of energy measured on different ones of the transmission resources dedicated by the macro base station for transmission of pilots and related device information. In some embodiments the UE 102 select one or more transmission resources on which the lowest energy is detected.

Returning to step 306. In step 306 the UE 102 receives a synchronization signal from the macro base station, e.g., base station 124. In various embodiments the UE 102 obtains timing information for transmitting pilot signals from the synchronization signal received from the macro base station.

Operation proceeds from steps 306 and 308 to step 312. In step 312 the UE 102 transmits a pilot signal and device identification information on the transmission resources dedicated by the macro base station for transmission of pilots and related device information, e.g., on the transmission resource(s) selected from the dedicated transmission resources. In some embodiments the transmitted pilot signal is a wide band pilot and the device identification information is e.g., a S-TMSI. In accordance with one aspect of some embodiments, one or both of steps 314 and 316 are performed as part of step 312. Thus as indicated in step 314, in some embodiments the UE 102 transmits the pilot signal and device identification information at a time determined based on the synchronization signal received from the macro base station. In some embodiments the synchronization signal is e.g., a downlink timing reference signal, a beacon signal or other timing synchronization signal such as an open loop timing control signal, transmitted by the macro base station. As indicated in step 316, in some embodiments the UE 102 transmits at least a portion of the pilot signal and device identification information at a predetermined, e.g., a fixed known, transmission power level.

Operation proceeds from step 312 to step 318. In step 318 the UE 102 receives handover information from a serving base station indicating that the UE device should perform a handoff from the serving base station to a femto base station, e.g., femto base station 4 118. In some embodiments the serving base station is a base station with which the UE is communicating user data. In some embodiments the serving base station is the macro base station, e.g., base station 124. In some embodiments the serving base station is a second femto base station, e.g., femto base station 1 112, the second femto base station being different than the femto base station to which the UE 102 is instructed to handover to. Thus it should be appreciated that the serving base station may be the macro base station that dedicates transmission resources for pilot transmissions, or may even be a femto base station serving the UE for communication of user data.

Operation proceeds from step 318 to step 320. In step 320 the UE 102 completes a handover operation from the serving base station to the femto base station in response to receiving the handover information from the serving base station.

Operation proceeds from step 320 to steps 322 and 324 which are performed independently in parallel in some embodiments. In step 322 the UE 102 obtains timing information from the femto base station which is the new serving access point for the UE 102 after the completion of handover. In some embodiments the timing information obtained from the femto base station is derived from a timing control signal, e.g., closed loop timing control signal, received by the UE 102 from the femto base station. In some embodiments the femto base station transmits, e.g., unicasts, closed loop timing control signal to the UE 102 to retard or advance timing based on a signal received from the UE 102 at the femto base station. Operation proceeds from step 322 to step 326. In step 326 the UE 102 transmits user data to the femto base station in accordance with the timing information obtained from the femto base station. In some embodiments the user data is transmitted on a different frequency band than a frequency band used by the macro base station. Operation proceeds from step 326 back to step 304.

Returning to step 324. In step 324 the UE 102 obtains and/or updates timing information, e.g., based on additional signal(s) such as synchronization signal, received from the macro base station. The UE 102 may, and in some embodiments does, receive synchronization signal from the macro base station on a periodic basis and updates the timing information previously obtained from the macro base station. In various embodiments UE 102 uses updated timing information when transmitting pilot signals and UE device identification information. Operation proceeds from step 324 to step 328. In step 328 the UE transmits, e.g., periodically, a pilot signal and UE device identification information in accordance with the timing information, e.g., updated timing information, obtained from the macro base station. Operation proceeds from step 328 back to step 304 and the operation may continue in this manner over time.

FIG. 4 illustrates an exemplary handover information message 400, communicated, e.g., from a serving base station, e.g., eNodeB, to a UE device, e.g., UE 102, in accordance with an exemplary embodiment. In some embodiments the handover information message 400 is generated by the base station serving the UE 102 to which the handover information message 400 is communicated. In some other embodiments the handover decision is made by a central control node which generates the handover message 400 and communicates it to the UE, e.g., via the base station serving the UE at that time.

As shown, the exemplary handover information message 400 includes a plurality of information fields including a message type ID field 402, a source ID field 404, a destination device ID field 406, a femto base station ID field 408 and femto BS resource information field 410.

The message type ID field 402 includes an identifier that identifies a type of message to which the message 400 relates, for example, the information in field 402 identifies that the message 400 includes handover information for a UE to perform handover operation. The source ID 404 includes an identifier corresponding to the serving base station (BS) which is transmitting the message 400, e.g., ID of base station 124 assuming BS 124 is serving the UE to which the message 400 is communicated.

The destination device ID field 406 includes identifier corresponding to the destination device to which the handover information message is sent. Thus in the illustrated example of FIG. 4 where the message 400 is sent to the UE 102, the destination device ID field 406 includes device identification information corresponding to the UE 102. In some embodiments if the handover message 400 is being broadcast to a plurality of devices, then the field 406 may include a broadcast group identifier.

The information field 408 includes identification information corresponding to the femto base station, e.g., ID of femto base station 118, to which the UE device is being instructed to handover to. The femto BS resource information field 410 includes information regarding femto BS resources, e.g., frequency band of operation, communication parameters etc., that are useful for the UE 102 which is handing off to the femto base station.

FIG. 5 illustrates another exemplary handover information message 500, communicated from a base station, e.g., eNodeB, or a central control node to a femto base station, e.g., femto base station 118 to which the UE device is going to handover to, in accordance with an exemplary embodiment. Depending on the embodiment, the handover information message 500 may be generated either by the serving base station serving the UE which is handing over to the femto base station, or by the central control. In the embodiments where the handover decision is made by the central control node, the handover message 500 is generated by the control node and is communicated to the femto base station, e.g., over the backhaul. For the purpose of discussion consider that the handover message 500 is generated by a serving base station, e.g., BS 124, serving the UE 102.

As shown, the exemplary handover information message 500 includes a plurality of information fields including a message type ID field 502, a source ID field 504, a destination device ID field 506, a field 508 including ID information of UE device, and UE device service and/or session related information field 510.

The message type ID field 502 includes an identifier that identifies a type of message to which the message 500 relates, for example, the information in field 502 identifies that the message 500 includes handover related information for a femto base station. The source ID 504 includes an identifier corresponding to the entity which is transmitting the handover message 500. For example, assuming the handover message 500 is transmitted by a base station, e.g., BS 124 serving the UE which is to be hander over to a femto BS, field 504 would include the identification information corresponding to the serving BS 124 identifying the base station as the source of the message 500.

The destination device ID field 506 includes identifier corresponding to the destination device to which the handover information message 500 is sent. Thus the ID field 506 includes identification information corresponding to the femto base station to which the message 500 is directed.

The information field 508 includes identification information corresponding to the UE device which is to be handed over to the femto base station to which the message 500 is sent, e.g., ID information corresponding to UE 102. The UE device service and/or session related information field 510 includes service and/or session related information corresponding to the UE device which is handing over to the femto base station. In some embodiments the service and/or session related information includes, e.g., UE device user service profile, Quality of service (QoS) parameters, session related information regarding an ongoing session between the UE device and its serving base station, etc. It should be appreciated that such information is provided so that the femto base station to which the UE is handed over can provide the services availed by the UE from its previous serving base station.

Figure 6:
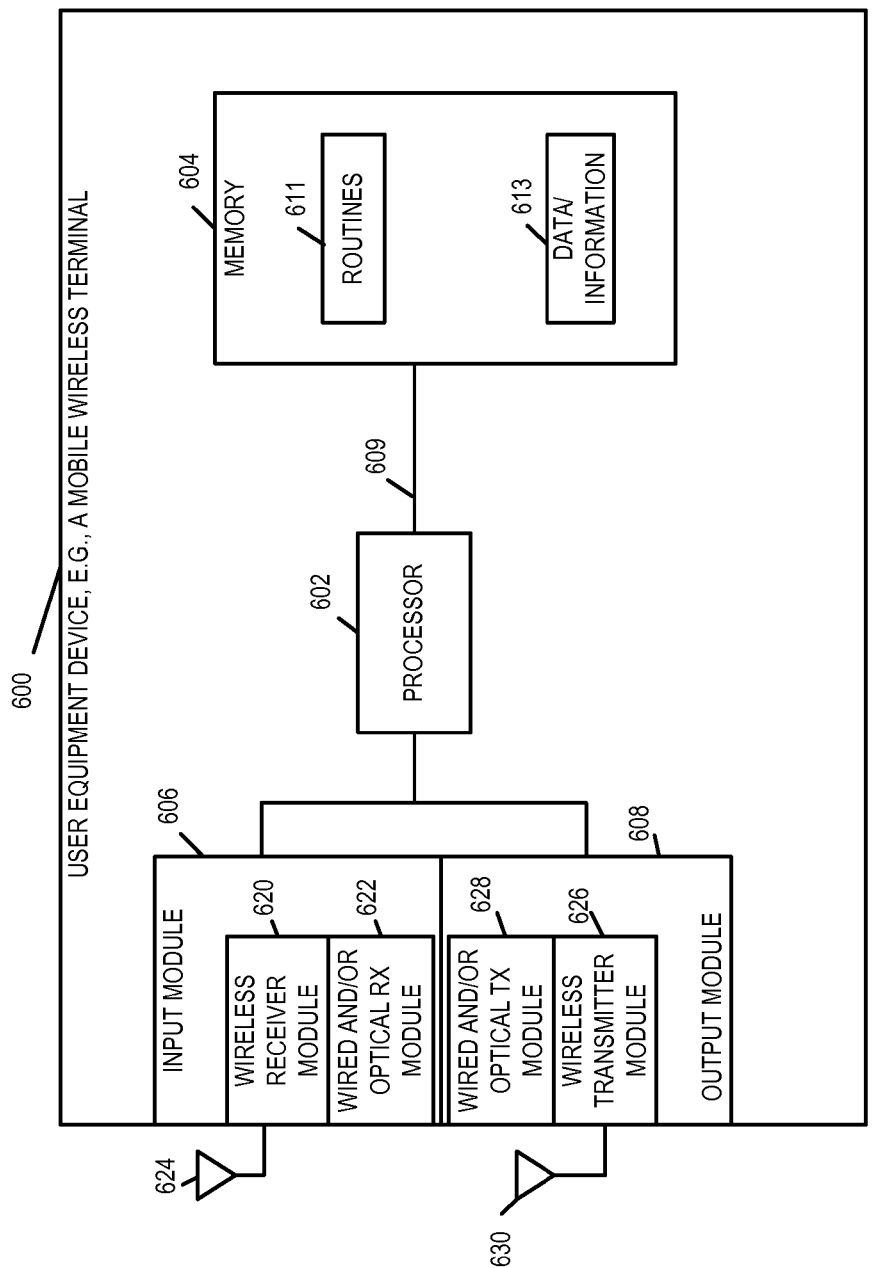
FIG. 6 illustrates an exemplary user equipment device which can be used as any one of the user equipments (UEs) shown in the exemplary system of FIG. 1.

FIG. 6 is a drawing of an exemplary user equipment (UE) device 600, e.g., a wireless terminal, in accordance with one exemplary embodiment. The UE device 600 can be used as any one of the UEs shown in the system of FIG. 1. Exemplary user equipment device 600 may, and sometimes does, implement a method in accordance with flowchart 300 of FIG. 3.

The UE device 600 includes a processor 602 and memory 604 coupled together via a bus 609 over which the various elements (602, 604) may interchange data and information. The UE device 600 further includes an input module 606 and an output module 608 which may be coupled to the processor 602 as shown. However, in some embodiments the input module and output module 606, 608 are located internal to the processor 602. Input module 606 can receive input signals. Input module 606 can, and in some embodiments does, include a wireless receiver 620 for receiving input over wireless communications links, and a wired and/or optical input receiver module 622 for receiving input over a wired and/or optical link. Output module 608 may include, and in some embodiments does include, a wireless transmitter 626 for transmitting output signals over wireless communications links and a wired or optical output interface 628 for transmitting output for transmitting output signals over a wired and/or optical link. In some embodiments, memory 604 includes routines 611 and data/information 613.

Processor 602, in some embodiments, is configured to monitor transmission resources, dedicated by a macro base station, e.g., macro BS 124, for transmission of pilots and related device information by UE devices, for energy on the transmission resources. In various embodiments the processor 602 is configured to measure energy on the dedicated transmission resources as part of monitoring the dedicated transmission resources for energy on the transmission resources, and identify the transmission resources on which lowest levels of energy are detected.

The processor 602 is further configured to select transmission resource(s) from the transmission resources dedicated by the macro base station for transmission of pilots and related device information. As part of selecting the transmission resources, the processor 602 is configured to select the transmission resource(s) based on an amount of energy measured on different ones of the transmission resources dedicated by the macro base station for transmission of pilots and related device information. In some embodiments the processor 602 is configured to select one or more transmission resources on which the lowest energy is detected as part of being configured to select.

In various embodiments the processor 602 is configured to monitor for and receive a synchronization signal from the macro base station. In various embodiments the processor 602 is configured to obtain timing information for transmitting pilot signals from the synchronization signal received (e.g., via the receiver 620) from the macro base station.

In various embodiments the processor 602 is configured to transmit (e.g., via the transmitter 626) a pilot signal and device identification information on transmission resources dedicated by the macro base station for transmission of pilots and related UE device information, e.g., on the selected transmission resource(s). In some embodiments the transmitted pilot signal is a wide band pilot and the device identification information is e.g., a S-TMSI. In some embodiments the processor 602 is configured to transmit the pilot signal and device identification information at a time determined based on the synchronization signal received from the macro base station. In some embodiments the synchronization signal is e.g., a downlink timing reference signal, a beacon signal or other timing synchronization signal such as an open loop timing control signal, transmitted by the macro base station. In some embodiments the processor 602 is configured to transmit (e.g., via the transmitter 626) at least a portion of the pilot signal and device identification information at a predetermined, e.g., a fixed known, transmission power level.

In various embodiments the processor 602 is further configured to receive (e.g., via the receiver 620) handover information from a serving base station indicating that the UE device should perform a handoff from the serving base station to a femto base station. In some embodiments the serving base station is a base station with which the UE 102 is communicating user data. In some embodiments the serving base station is the macro base station, e.g., base station 124. In some embodiments the serving base station is a second femto base station, e.g., femto base station 1 112, the second femto base station being different than the femto base station to which the UE 102 is instructed to handover to.

Processor 602 in various embodiments is further configured to complete a handover operation from the serving base station to the femto base station in response to receiving the handover information from the serving base station. In some embodiments the processor 602 is further configured to obtain timing information from the femto base station, which is the new serving access point for the UE 102 after the completion of handover. In some embodiments the timing information obtained from the femto base station is derived from a timing control signal, e.g., closed loop timing control signal, received from the femto base station. In some embodiments the closed loop timing control signal includes instructions to retard or advance timing, e.g., transmission timing.

In some embodiments the processor 602 is further configured to transmit (e.g., via the transmitter 626) user data to the femto base station in accordance with the timing information obtained from the femto base station. In some embodiments the processor 602 is further configured to transmit (e.g., via the transmitter 626) the user data on a different frequency band than a frequency band used by the macro base station.

In some embodiments the processor 602 is further configured to obtain and/or update timing information, e.g., based on additional signal(s) such as a synchronization signal, received from the macro base station. The UE 600 may, and in some embodiments does, receive (e.g., via the receiver 620) synchronization signal from the macro base station on a periodic basis and updates the timing information previously obtained from the macro base station. In various embodiments the processor 602 is further configured to use updated timing information when transmitting pilot signals and UE device identification information.

In some embodiments the processor 602 is further configured to transmit, e.g., e.g., via the transmitter 626, a pilot signal and UE device identification information in accordance with the timing information, e.g., updated timing information, obtained from the macro base station. In some embodiments the pilot signal and UE device identification information is transmitted periodically.

Figure 7:
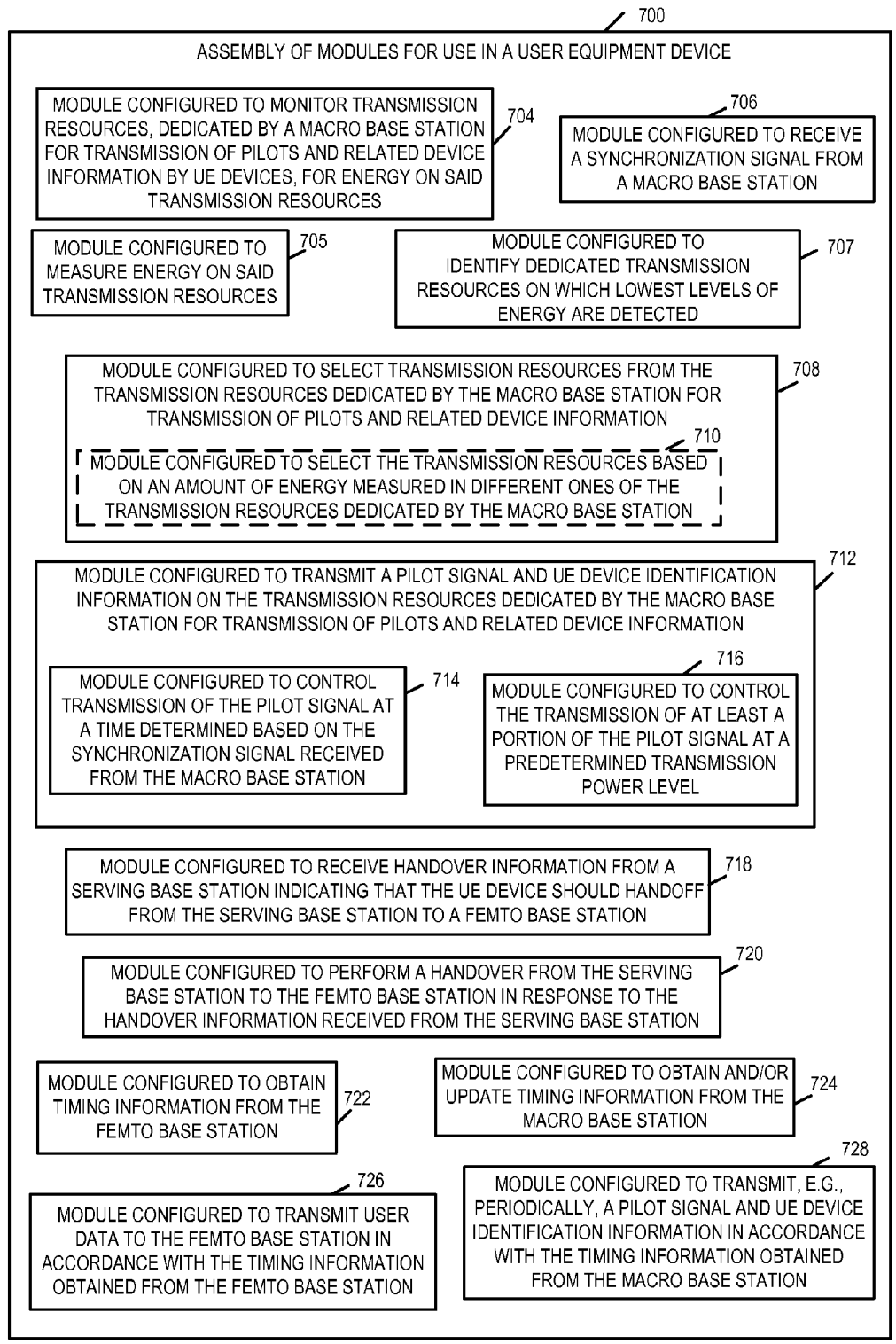
FIG. 7 illustrates an assembly of modules which can be used in the exemplary user equipment device shown in FIG. 6.

FIG. 7 is an assembly of modules 700 which can, and in some embodiments is, used in the user equipment device 600 illustrated in FIG. 6. Assembly of modules 700 can be implemented in hardware within the processor 602 of the UE device 600 of FIG. 6, e.g., as individual circuits. The modules in the assembly 700 can, and in some embodiments are, implemented fully in hardware within the processor 602, e.g., as individual circuits. In other embodiments some of the modules are implemented, e.g., as circuits, within the processor 602 with other modules being implemented, e.g., as circuits, external to and coupled to the processor. As should be appreciated the level of integration of modules on the processor and/or with some modules being external to the processor may be one of design choice. In some but not necessarily all embodiments modules 705, 707, 708, 710, 720, 722, 724 etc., are implemented in the processor 602 with the other modules, e.g., modules 706, 712, 718, 726, 728, being implemented in the processor and/or external to the processor 602.

Alternatively, rather than being implemented as circuits, all or some of the modules may be implemented in software and stored in the memory 604 of the UE device 600 with the modules controlling operation of the UE device 600 to implement the functions corresponding to the modules when the modules are executed by a processor, e.g., processor 602. In some such embodiments, the assembly of modules 700 is included in routines 611 of memory 604 of device 600 of FIG. 6. In still other embodiments, various modules are implemented as a combination of hardware and software, e.g., with a sensor or another circuit external to the processor providing input to the processor 602 which then under software control operates to perform a portion of a module's function.

While shown in the FIG. 6 embodiment as a single processor, e.g., computer, it should be appreciated that the processor 602 may be implemented as one or more processors, e.g., computers.

When implemented in software the modules include code, which when executed by the processor 602, configure the processor 602 to implement the function corresponding to the module. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 7 control and/or configure the UE device 600 or elements therein such as the processor 602, to perform the functions of the corresponding steps illustrated in the method flow chart 300 of FIG. 3.

The assembly of modules 700 includes a module corresponding to each step of the method shown in FIG. 3. The module in FIG. 7 which performs or controls the processor 602 to perform a corresponding step shown in FIG. 3 is identified with a number beginning with a 7 instead of beginning with 3. For example module 704 corresponds to step 304 and is responsible for performing the operation described with regard to step 304.

As illustrated in FIG. 7, the assembly of modules 700 includes a module 704 configured to monitor transmission resources, dedicated by a macro base station for transmission of pilots and related device information by UE devices, for energy on the transmission resources, a module 705 configured to measure energy on the dedicated transmission resources, a module configured to identify the transmission resources, from the transmission resources dedicated by the macro base station for transmission of pilots and related device information, on which lowest levels of energy are detected, and a module 706 configured to receive a synchronization signal from the macro base station. In some embodiments the module 706 is further configured to obtain timing information, e.g., used for transmitting pilot signals, from the synchronization signal received from the macro base station.

In various embodiments the assembly of modules 700 further includes a module 707 configured to identify dedicated transmission resources on which lowest levels of energy are detected, e.g., as measured by module 705, and a module 708 configured to select transmission resource(s) from the transmission resources dedicated by the macro base station for transmission of pilots and related device information. In some embodiments the selection module 708 further includes a module 710 configured to select the transmission resource(s) based on an amount of energy measured on different ones of the transmission resources dedicated by the macro base station for transmission of pilots and related device information. In some embodiments the module 710 is configured to select one or more transmission resources on which the lowest energy is detected.

In various embodiments the assembly of modules 700 further includes a module 712 configured to transmit a pilot signal and device identification information on transmission resources dedicated by the macro base station for transmission of pilots and related UE device information, e.g., on the selected transmission resource(s), a module 718 configured to receive handover information from a serving base station indicating that the UE device should perform a handoff from the serving base station to a femto base station, and a module 720 configured to perform and complete a handover operation from the serving base station to the femto base station in response to receiving the handover information from the serving base station. In some embodiments the module 712 includes a module 714 configured to transmit the pilot signal and device identification information at a time determined based on the synchronization signal received from the macro base station and a module 716 configured to transmit at least a portion of the pilot signal and device identification information at a predetermined, e.g., a fixed known, transmission power level. In some embodiments the synchronization signal is e.g., a downlink timing reference signal, a beacon signal or other timing synchronization signal such as an open loop timing control signal, transmitted by the macro base station.

In some embodiments the serving base station is a base station with which the UE 600 is communicating user data. In some embodiments the serving base station is the macro base station. In some embodiments the serving base station is a second femto base station, the second femto base station being different than the femto base station to which the UE 600 is instructed to handover to. In some embodiments the transmitted pilot signal is a wide band pilot and the device identification information is e.g., a S-TMSI.

In some embodiments the assembly of modules 700 further includes a module 722 configured to obtain timing information from the femto base station, to which the UE handed over following the completion of handover. In some embodiments the module 722 is configured to derive the timing information from a timing control signal, e.g., closed loop timing control signal, received from the femto base station. The assembly of modules in some embodiments further includes a module 726 configured to transmit user data to the femto base station in accordance with the timing information obtained from the femto base station. In some embodiments the module 726 is further configured to transmit the user data on a different frequency band than a frequency band used by the macro base station.

In some embodiments the assembly of modules 700 further includes a module 724 configured to obtain and/or update timing information, e.g., based on additional signal(s) such as a synchronization signal, received from the macro base station, and a module 728 configured to transmit, e.g., periodically, a pilot signal and UE device identification information in accordance with the timing information, e.g., updated timing information, obtained from the macro base station.

In some embodiments the module 706 is configured to receive synchronization signals from the macro base station on a periodic basis. In various embodiments the module 724 obtains timing information based on the recent timing signals received by the module 706 and updates the previously obtained timing information. In various embodiments the module 728 is configured to use updated timing information when transmitting pilot signals and UE device identification information.

The modules shown in dashed lines boxes are optional, and thus one or more of these modules may be present in some embodiments while not in others. The dashed boxes indicate that although these modules are included in the assembly of modules 700 in various embodiments, the processor 602 may execute such an optional module in embodiments where the step to which these modules correspond, is performed. In some embodiments, one or more modules shown in FIG. 7 which are included within another module may be implemented as an independent module or modules.

While various exemplary embodiments have been described, the features described herein can be used in a wide range of embodiments and applications.

In accordance with one aspect, an exemplary method proposed in accordance with some embodiments, includes a macro base station allocates periodic resources in uplink (UL) resources for active UEs (e.g., such as RRC_CONNECTED UEs in an LTE embodiment) to transmit wideband pilot-like signals. Small cells, e.g., femto base stations under, e.g., within, the macro base station coverage area do not schedule any UE during these periodic resources in at least some embodiments In some implementations various active UEs autonomously choose one of the resource and transmit periodically a wideband pilot as well as its identity (e.g. S-TMSI) in one of the periodic resources. The selection of transmission resources in some embodiments involves one or more of the following: UE determines whether a resource is occupied based on the received signal strength on the resource, the UE chooses the resource that is deemed as vacant, e.g., the resource with the least energy measured when monitoring the resources for detecting energy; and/or the UEs transmit using a predetermined, e.g. fixed known, power level along with device identification information.

In various embodiments the resource selection for pilot transmission purposes is done autonomously by UEs. The Macro base station or small cells do not allocate pilot transmission resources to specific UEs. The reasons for this approach include the fact that the macro or small cell (femto) may not be aware of which UEs can spatially reuse the resources; the macro or small cell (femto) may not be aware if the UEs is connected to a small cell or macro.

In various embodiments the active UEs within a macro cell use a timing that is derived from a common source when determining when to transmit pilot signal on the UE pilot signal resources dedicated by the macro base station 124. For example, in some embodiments the UEs use macro base station's downlink (DL) time. In some other embodiments the UEs use UL timing required to transmit to the macro base station 124 even if the UE is not connected to the macro base station 124. It should be appreciated that in some embodiments the UE cannot, and does not, use its current UL timing for UE pilot signal transmissions in the dedicated UE pilot transmission signal resources. For example, the UL timing of a first UE 102 communicating with a macro base station 124 and a second UE 104 communicating with a femto base station 114 may be different and may have an offset which is greater than the cyclic prefix (CP) length being used for symbol transmission. In such a case the signals transmitted to the serving femto base station 114 may not be synchronous at other femto base stations 120 monitoring to receive the pilots making use of another timing reference, e.g., a timing reference available to all the femto base stations 120 114 desirable.

In some embodiments the femto base stations receive the pilot signal transmissions, measure RSSI of the UE pilot transmissions, decode any information such as the device's device identifier communicated with the pilot signal, and report the signal measurements and other information to the identified UE's donor eNodeB (eNB) and/or the system controller 130. The femto base stations 114, 120 can determine, in at least some embodiments, the donor eNB by communicating the identity of the UE 102 from which a pilot is received (S-TMSI) to the mobility management entity (MME) 160, e.g., over an S1 interface, and can report the signal measurement and related information to the identified donor eNB.

Alternately, in some other embodiments the femto base stations 114, 120 can and do report the measurements to a central entity, e.g., a macro base station 124 and/or a control node 130, that makes handover decisions within the macro cell in which the identified UE from which a pilot signal is received is located.

Following the receipt of measurement reports from the femto base stations, the donor eNB or central entity 130 normally makes a handover decision and communicates the decision, when a change in the serving base station is to be made, to the relevant base stations and nodes in the system. This may involve communicating a handover decision to a femto base station (e.g., over the backhaul network) and to the UE being handed over, e.g., with the handover information being communicated over a downlink (DL) between a current serving base station and the UE being handed off.

In various embodiments, prior to transmitting the UE pilot signal and related device information, the UE identifies and selects a transmission resource, out of the transmission resources dedicated by the macro base station 124 for pilot transmission, for transmission of pilot signal and device identification information. In some embodiments the UE 102 monitors the dedicated transmission resources to detect energy, e.g., signal strength, on these resources to determine which of the resources are occupied and which ones are vacant and/or available to use. Based on the detected signal strength on the resource the UE 102 determines whether a resource is occupied or vacant. In some embodiments the UE 102 selects a resource that is deemed as vacant; e.g., the resource with the least energy.

It should be appreciated that that the resource selection for pilot transmission purposes is done autonomously by the UEs 102, 104, 106, 110. The macro base station 124 and/or small cells (e.g., femto base stations 118, 114) do not allocate pilot transmission resources to specific UEs, rather the macro base station 124 dedicates periodic resources for pilot and identification information transmission for UEs operating in the macro base stations coverage area. Some of the reasons for this approach include: i) the macro base station or small cells may not be aware of which UEs can spatially reuse the resources, so the resource selection is rather more effective if the decision of selection is left to the UEs; ii) the macro base station or small cell may not be aware of the UEs connected to small cells and/or macro.

Various features in some but not necessarily all exemplary embodiments are particularly well suited for use with LTE.

The techniques of various embodiments may be implemented using software, hardware and/or a combination of software and hardware. Various embodiments are directed to apparatus, e.g., mobile nodes such as mobile wireless terminals, base stations, communications system. Various embodiments are also directed to methods, e.g., method of controlling and/or operating a communications device, e.g., wireless terminals (UEs), base stations, control nodes and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the invention.

In some embodiments, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with user equipment devices, e.g., mobile nodes, using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a UE device, the method comprising:
   identifying transmission resources allocated by a macro base station for use by UE devices, said transmission resources being a periodic allocation dedicated for transmission of UE pilots and related UE device information, and said transmission resources being unassigned to specific UE devices;
   transmitting a pilot signal and UE device identification information to at least one femto base station on said identified transmission resources allocated by said macro base station for use by UE devices; and
   receiving handover information from a serving base station, responsive to said transmitted pilot signal and UE device identification information, said handover information indicating that said UE device should handoff from said serving base station to a femto base station.

2. The method of claim 1, further comprising:
   selecting, at said UE device for said transmitting, a subset of said identified transmission resources allocated by said macro base station for use by UE devices.

3. The method of claim 2, further comprising:
   monitoring for energy on said identified transmission resources allocated by said macro base station for use by UE devices,
   wherein said selecting a subset of said identified transmission resources allocated by said macro base station for use by UE devices is based at least in part on an amount of energy measured in different portions of said identified transmission resources allocated by said macro base station for use by UE devices.

4. The method of claim 1, wherein transmitting said pilot signal and UE device identification information includes transmitting at least a portion of said pilot signal at a predetermined transmission power level.

5. The method of claim 1, wherein transmitting said pilot signal includes transmitting said pilot signal at a time determined based at least in part on a synchronization signal received from said macro base station.

6. The method of claim 1, further comprising:
   completing a handover from said serving base station to said femto base station in response to said handover information received from the serving base station; and
   periodically transmitting a pilot signal with UE device identification information in accordance with timing information obtained from said macro base station after said handoff to said femto base station.

7. The method of claim 6, further comprising:
   transmitting user data to said femto base station in accordance with timing information obtained from said femto base station.

8. The method of claim 7, wherein said user data is transmitted on a different frequency band than a frequency band used by said macro base station.

9. A user equipment (UE) device, comprising:
   means for identifying transmission resources allocated by a macro base station for use by UE devices, said transmission resources being a periodic allocation dedicated for transmission of UE pilots and related UE device information, and said transmission resources being unassigned to specific UE devices;
   means for transmitting a pilot signal and UE device identification information to at least one femto base station on said identified transmission resources allocated by said macro base station for use by UE devices; and
   means for receiving handover information from a serving base station, responsive to said transmitted pilot signal and UE device identification information, said handover information indicating that said UE device should handoff from said serving base station to a femto base station.

10. The UE device of claim 9, further comprising:
    means for selecting, for said transmitting, a subset of said identified transmission resources allocated by said macro base station for use by UE devices.

11. The UE device of claim 10, further comprising:
    means for monitoring for energy on said identified transmission resources allocated by said macro base station for use by UE devices,
    wherein said means for selecting a subset of said identified transmission resources allocated by said macro base station for use by UE devices is operable based at least in part on an amount of energy measured in different portions of said identified transmission resources allocated by said macro base station for use by UE devices.

12. The UE device of claim 9, wherein said means for transmitting said pilot signal and UE device identification information include means for transmitting at least a portion of said pilot signal at a predetermined transmission power level.

13. The UE device of claim 9, wherein said means for transmitting said pilot signal and UE device identification information include means for controlling the transmission of said pilot signal at a time determined based on a synchronization signal received from said macro base station.

14. The UE device of claim 9, further comprising:
means for completing a handover from said serving base station to said femto base station in response to said handover information received from the serving base station; and
means for controlling said means for transmitting to periodically transmit a pilot signal with UE device identification information in accordance with timing information obtained from said macro base station after said handoff to said femto base station.

15. The UE device of claim 14, further comprising:
means for transmitting user data to said femto base station in accordance with timing information obtained from said femto base station.

16. A user equipment (UE) device, comprising:
at least one processor configured to:
identify transmission resources allocated by a macro base station for use by UE devices, said transmission resources being a periodic allocation dedicated for transmission of UE pilots and related UE device information, and said transmission resources being unassigned to specific UE devices;
transmit a pilot signal and UE device identification information to at least one femto base station on said identified transmission resources allocated by said macro base station for use by UE devices; and
receive handover information from a serving base station, responsive to said transmitted pilot signal and UE device identification information, said handover information indicating that said UE device should handoff from said serving base station to a femto base station; and
a memory coupled to said at least one processor.

17. The UE device of claim 16, wherein said at least one processor is further configured to:
select, for said transmitting, a subset of said identified transmission resources allocated by said macro base station for use by UE devices.

18. The UE device of claim 17, wherein said at least one processor is further configured to:
monitor for energy on said transmission resources allocated by said macro base station for use by UE devices; and
select said subset of said identified transmission resources allocated by said macro base station for use by UE devices based at least in part on an amount of energy measured in different portions of said identified transmission resources allocated by said macro base station for use by UE devices.

19. The UE device of claim 16 wherein said at least one processor is further configured to:
transmit at least a portion of said pilot signal at a predetermined transmission power level, as part of being configured to transmit said pilot signal and UE device identification information.

20. A non-transitory computer-readable medium storing computer-executable code for wireless communication, the code comprising instructions executable by a processor to cause a wireless device to:
identify transmission resources allocated by a macro base station for use by UE devices, said transmission resources being a periodic allocation dedicated for transmission of UE pilots and related UE device information, and said transmission resources being unassigned to specific UE devices;
transmit a pilot signal and UE device identification information to at least one femto base station on said identified transmission resources allocated by said macro base station for use by UE devices; and
receive handover information from a serving base station, responsive to said transmitted pilot signal and UE device identification information, said handover information indicating that said UE device should handoff from said serving base station to a femto base station.

* * * * *